UNITED STATES PATENT OFFICE.

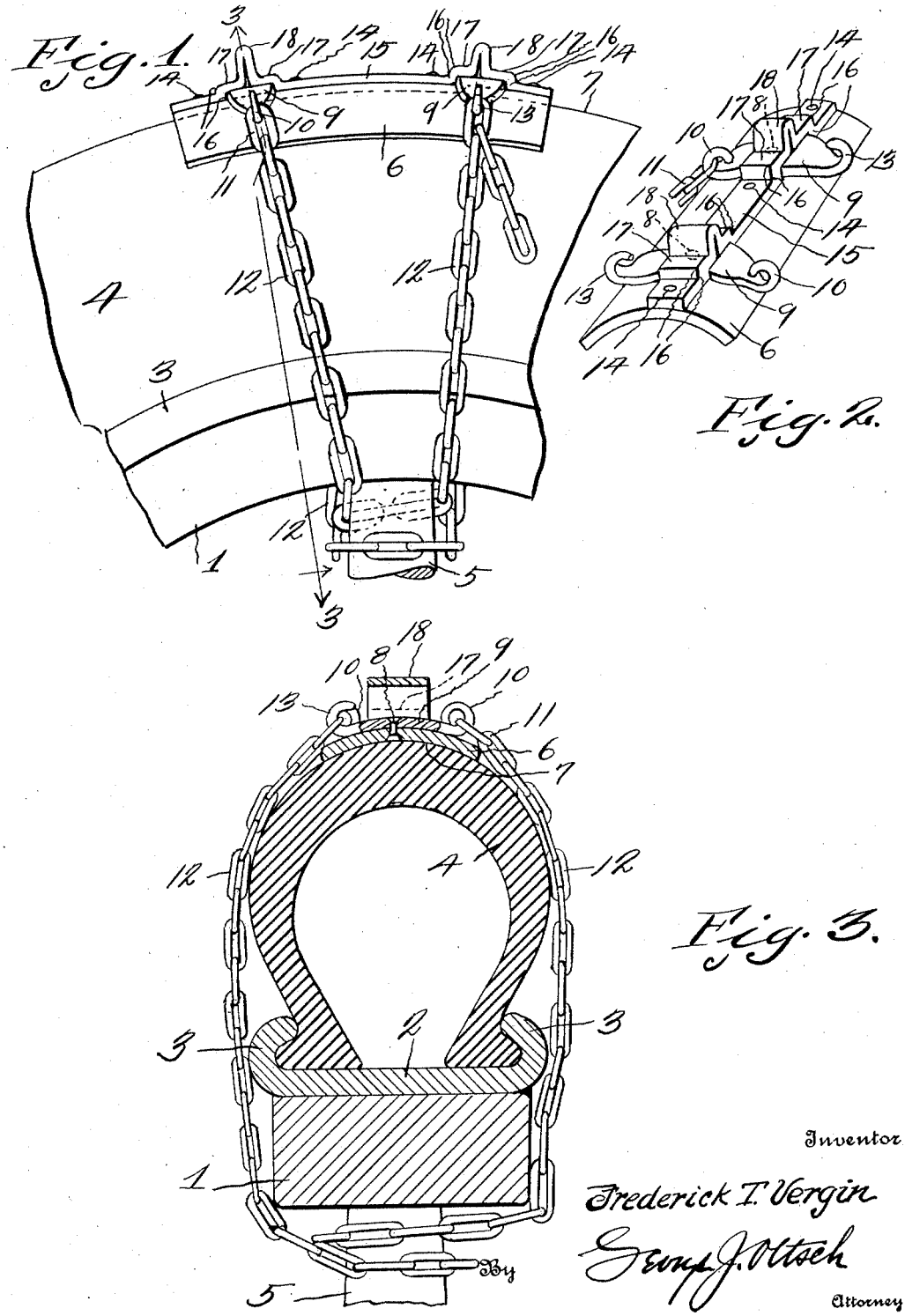

FREDERICK T. VERGIN, OF SOUTH BEND, INDIANA.

ANTISKID ATTACHMENT.

1,415,738.　　　　　Specification of Letters Patent.　　Patented May 9, 1922.

Application filed February 13, 1922. Serial No. 536,294.

*To all whom it may concern:*

Be it known that I, FREDERICK T. VERGIN, a citizen of the United States, residing at South Bend, in the county of St. Joseph and State of Indiana, have invented certain new and useful Improvements in Antiskid Attachments, of which the following is a specification.

The invention relates to antiskid attachments for automobile wheels, and has for its object to provide an elongated segmentally shaped plate segmentally shaped in longitudinal and transverse cross section and adapted to engage and be disposed on the tread of the tire and held thereon by means of chains. Also to provide the antiskid device with transversely disposed plates, in eyes at the ends of which chains are secured, which chains pass over the felly of the wheel around the adjacent spoke and thence to a hook carried by the end of the other transversely disposed plate, which hook is disposed on the same side of the device as the eye from which the chain starts. Also to provide a chain connected to one of the plates at the opposite sides of the device, which chain passes around the spoke and thence to a hook carried by the other plate and located on the same side of the device.

A further object is to provide chains of sufficient length to allow the device to be applied to various sizes of tires and wheels.

A further object is to provide an antiskid device comprising a tire tread engaging plate segmentally shaped in transverse and longitudinal cross section, said plate having secured to its outer side transversely disposed segmentally shaped plates spaced from each other and provided with chain connecting means at their ends for holding the device in engagement with the tire. Also to provide a longitudinally disposed member bent to form transversely disposed ground engaging ribs disposed above the transversely disposed plates, and also bent to conform to the transverse contour of the plates.

With the above and other objects in view the invention resides in the combination and arrangement of parts as hereinafter set forth, shown in the drawings, and claimed, it being understood that changes in the precise embodiment of the invention may be made within the scope of what is claimed without departing from the spirit of the invention.

In the drawing:—

Figure 1 is a side elevation of a portion of a conventional form of automobile wheel, showing the device applied thereto.

Figure 2 is a perspective view of the tire engaging plate,

Figure 3 is a transverse sectional view taken on line 3—3 of Figure 1.

Referring to the drawing, the numeral 1 designates the felly of a conventional form of automobile wheel, and 2 the tire receiving channel carried thereby in the flanges 3 of which a conventional form of pneumatic tire 4 is held. The felly 1 is provided with conventional spokes 5, one of which is shown for illustrative purposes. The antiskid device comprises the tire engaging plate 6, which plate is segmentally shaped in longitudinal and transverse cross section and is adapted to be placed on the tread 7 of the tire and held in engagement with said tread, in such a manner that the wheel will be held against skidding and against spinning, or slipping as the vehicle advances. Secured to the outer face of the plate 6 by means of rivets 8 are transversely disposed segmentally shaped plates 9, which plates have one of their ends provided with eyes 10 for the reception of the ends 11 of the securing chains 12, which chains pass over the felly 1, thence around the spoke 5 and extend outwardly over the side of the felly adjacent the other portion of the particular chain and have their free ends connected to the hooks 13 of the plates 9. It will be seen that by providing chains passing around the spoke 5 as set forth that the device will be securely held on the tread 7 of the tire and will be prevented from transverse movement as well as circumferential movement in relation to the tire. The chains 12 are preferably of sufficient length to allow the device to be applied to various sizes of automobile wheels and tires. Secured to the plate 6 by means of rivets 14 is a longitudinally disposed member 15, the ends of which member are bent at right angles at 16 to form portions 17, which overlie the transversely disposed plates 9. Portions 17 are in turn bent at right angles to form the outwardly extending ground engaging members 18, which members bite into the ground and prevent spinning of the wheels as well as preventing skidding of the wheels.

From the above it will be seen that an antiskidding device is provided for automobile wheels, which device is simple in construction, and one wherein the ribs 18 are formed by bending the longitudinally disposed strip 15 to form the ribs, which ribs are disposed above the plates 9 and carried by members which arch the plates 9, thereby protecting the plates 9 and their securing means 8 from wear, and at the same time holding the plates 9 against pivotal movement on the rivets 8.

The invention having been set forth what is claimed as new and useful is:—

1. An antiskid device for automobile wheels having spokes, said device comprising a plate segmentally shaped in longitudinal and transverse cross section and adapted to engage the tread of a tire, transversely disposed plates secured to the segmentally shaped plate, chains connected to the ends of the transversely disposed plates at diametrically opposite sides, said chains passing around the adjacent spoke of the wheel, the free ends of said chain being detachably secured to the ends of the plates at diametrically opposite sides, said chains being of sufficient length to allow the device to be applied to various sizes of wheels and tires.

2. An antiskid device for automobile wheels, said device comprising an elongated plate segmentally shaped in longitudinal and transverse cross section, transversely disposed members secured to the elongated plate adjacent its ends, a longitudinally disposed reinforcing plate secured to the outer face of the segmentally shaped elongated plate, said reinforcing plate being formed from a single piece of material and bent to arch the transversely disposed members, said longitudinally disposed reinforcing plate being bent upon itself to form ground engaging elements disposed over the transversely disposed members, and means connected to the ends of the transversely disposed members for securely holding the device as a whole in position on the tire.

3. An antiskid device comprising an elongated tire engaging plate, transversely disposed members secured to said plate and spaced from each other, means whereby securing means may be attached to the end of the transversely disposed members, a longitudinally disposed reinforcing plate carried by the tire engaging plate and provided with offset portions for the reception of the transversely disposed members, said reinforcing plate being bent upon itself to form ground engaging elements disposed over the transversely disposed plates.

4. An antiskid device for vehicle tires, said device comprising an elongated tire engaging plate, transversely disposed members secured to said plate, means carried by the ends of said transversely disposed members for the reception of securing means, a reinforcing plate secured to the elongated tire engaging plate and arching the transversely disposed members, said reinforcing plate being bent upon itself centrally of the arched portions thereof and forming outwardly extending ground engaging members.

In testimony whereof I affix my signature.

FREDERICK T. VERGIN.